United States Patent [19]

Germano

[11] 4,020,220

[45] Apr. 26, 1977

[54] COMPOSITE COATING HAVING ENHANCED CORROSION RESISTANCE

[75] Inventor: Victor V. Germano, Kirtland, Ohio

[73] Assignee: Diamond Shamrock Corporation, Cleveland, Ohio

[22] Filed: Mar. 20, 1975

[21] Appl. No.: 560,376

[52] U.S. Cl. .......................... 428/472; 427/374 B; 427/380

[51] Int. Cl.[2] ...................... B05D 7/14; B05D 1/38; B32B 15/04

[58] Field of Search ................. 427/380, 374, 419; 148/6.2; 428/539, 469, 472

[56] References Cited

UNITED STATES PATENTS 3,956,531 5/1976 Church et al. .................... 427/380

*Primary Examiner*—James R. Hoffman

*Attorney, Agent, or Firm*—John J. Freer

[57] ABSTRACT

Composite coatings, of an undercoating plus a subsequent coating each containing a multi-valent metal, can achieve excellent corrosion protection when the coatings are subjected to appropriate heat curing. Such curing for a subsequent coating is generally under conditions unlike those of a similar, or the same, undercoating. Firstly, control over cure temperature and time is exercised with the undercoating to virtually eliminate its water sensitivity. Then for example, water quenching may be used in cooling. Next, differing cure conditions for the topcoating are used to favor augmented corrosion resistance for the composite.

12 Claims, No Drawings

COMPOSITE COATING HAVING ENHANCED CORROSION RESISTANCE

BACKGROUND OF THE INVENTION

Coating compositions, especially for metal substrates, that are applied prior to painting and then heat cured, are often used to impart corrosion resistance to metal surfaces as well as enhance adhesion of subsequently applied paints. Such compositions typically contain a metal in non-elemental form, which metal can exhibit multi-valency and is susceptible to valency reduction to a lower state during curing of applied composition. For example, in U.S. Pat. No. 3,671,331 there are disclosed chromium bonding compositions that contain a hexavalent-chromium-providing compound and reducing agent therefor in liquid medium.

Such compositions exhibit excellent adherence to metal substrates and offer many desirable characteristics, including the formation of a firm bond between subsequently applied topcoats and the underlying metal substrate. Some of these topcoats can be additional compositions containing a multi-valent metal in aqueous medium. In U.S. Pat. No. 3,718,509 there is disclosed a coating such as can be provided by U.S. Pat. No. 3,671,331, which coating is topcoated with a chromium bonding coating. Such topcoating can contain hexavalent-chromium-providing compound in a liquid medium containing water.

After the pre-paint coating and then the topcoat application and curing, a resulting coated article is most usually required to exhibit corrosion resistance for the coated substrate. In addition, prior to application of the topcoating, the initially coated metal should, most desirably, be water resistant. This water resistance not only maintains coating integrity during application of a subsequent coating, but also permits water quenching to be used in cooling the initially coated article. Water quenching can provide most economical cooling. This cooling is most desirable where the subsequent coating will be applied by immersion coating technique, and such subsequent coating composition is heat sensitive.

SUMMARY OF THE INVENTION

It has now been found that corrosion resistance of coating composites can be desirably enhanced when both the pre-paint and the topcoating compositions are formulated with multi-valent metal and careful control is exercized over cure conditions. Additionally, water sensitivity of the base coating can be sufficiently supressed to permit not only topcoating with compositions that are water-based, but also to permit water quenching of base coatings after heat curing.

In one aspect, the present invention is directed to a process of protecting a coatable substrate with a coating composite, wherein a portion of the coating composite comprises an undercoating and a subsequent coating, each established from heat curable compositions that before curing contain, in liquid medium, a metal in non-elemental form, which metal can exhibit multi-valency and is susceptible to valency reduction to a lower valence state during curing of applied composition. Moreover, such metal is at least partially present in the composition in a higher valency state and the compositions each further contain reducing agent for the metal. The invention process provides extended substrate corrosion resistance protection by first establishing the undercoating in the composite, for providing substrate protection, but in non water-resistant condition, and then precuring the established undercoating, at elevated temperature, to a dry and water-resistant coating, with the conditions of the elevated temperature precuring being selected to orient the undercoating towards containing a minimum amount of the metal in a higher valency state. Next the process provides for establishing the subsequent coating of the composite for providing substrate protection, with said subsequent coating being established in non water-resistant condition, and finally, curing the subsequent coating through the conditions of the precuring, thereby initially orienting the subsequent coating towards minimization of higher valency state metal, and with the elevated temperature conditions by continuation thereof, then orienting this subsequent coating away from the minimization of higher valency state metal.

The present invention is also directed to composite coated substrates, as well as to subsequently painted substrates that can be thereby obtained.

DESCRIPTION OF THE PREFERRED EMBODIMENTS

The known pre-paint coatings, each of which may also be termed herein as an "undercoating" or "base coating," need not be complex. Such coatings, which may be of the chromate type,may form highly adherent coatings on the substrate metal surface.Such compositions are susceptible to curing at elevated temperature. Some of the very simple undercoating compositions, such as have been taught in U.S. Pat. No. 3,687,738, can merely contain chromic acid and a particulate metal such as aluminum, manganese, zinc and magnesium. Further, these particulate metals have been disclosed as useful in bonding coating compositions, containing a hexavalent-chromium-providing substance and reducing agent therefor, in U.S. Pat. No. 3,671,331.

Of particlar interest in the present invention are the bonding coatings, i.e., coatings from compositions containing hexavalent-chromium-providing substance and a reducing agent therefor. Those that are preferred may contain succinic acid and other dicarboxylic acids of up to 14 carbon atoms as the reducing agents, as has been disclosed in U.S. Pat. No. 3,382,081. Such acids with the exception of succinic may be used alone, or these acids can be used in mixture or in mixture with other organic substances exemplified by aspartic acid, acrylamide or succinimide. Additionally useful combinations that are particularly contemplated are combinations of mono-, tri- or polycarboxylic acids in combination with additional organic substances as has been taught in U.S. Pat. No. 3,519,501. Also of particular interest are the teachings in regard to reducing agents, that may be acidic in nature, and have been disclosed in U.S. Pat. Nos. 3,535,166 and 3,535,167. Of further particular interest are glycols and glycol-ethers and many representative compounds have been shown in U.S. Pat. No. 3,679,493.

Substantially all of the pre-paint undercoatings compositions are simple water based, ostensibly for economy. But for additional or alternative substances, to supply the liquid medium at least for some of these compositions, there have been taught, as in U.S. Pat. No. 3,437,531, blends of chlorinated hydrocarbons and a tertiary alcohol including tertiary butyl alcohol as well as alcohols other than tertiary butyl alcohol. It would appear then in the selection of the liquid medium that economy is of major importance and thus such medium would most always contain readily commercially available liquids. The undercoating, although it may contain elemental metal, e.g., the pulverulent metals mentioned hereinabove, will also contain metal in non-elemental form. This will be metal such as chromium, as has been mentioned hereinabove. This metal can exhibit multi-valency and is present in the undercoating composition at least partially in a higher valency state. For example, chromium is typically present in the hexavalent state by incorporation into undercoating compositions as chromic acid or dichromate salts or the like. During the curing of the applied coating composition, the metal is susceptible to valency reduction to a lower valence state. Such reduction is generally enhanced by the presence of the reducing agent in the composition.

When the undercoating is established, typically by application directly to the surface of the substrate to be coated, although such substrate might be a precoated metal substrate, such as for example, a phosphatized metal substrate, the applied coating will be non-water resistant. That is, such applied coating, prior to curing, can be easily removed by rubbing with a damp cloth. The undercoating thus established is then subjected to elevated temperature precuring conditions. These conditions are selected to initially transform the established undercoating to a dry and water-resistant coating. The same rubbing with a damp cloth is typically a most ready means for testing the water resistant nature of the precured coating, after precuring and cooling of the coating.

Further, the precuring conditions at elevated temperature are selected to orient the undercoating towards containing a minimum amount of the multi-valent metal in a higher valency state. Although multi-valent metals other than chromium can be present in the cured undercoating, such as for example molybdenum and tungsten, and even such multi-valent metals as manganese are contemplated to be present in the undercoating, chromium is selected as representative for determination of the appropriate cure conditions. In general, the precure conditions for chromiumcontaining undercoatings are cure temperatures below 550° F. air temperature, and at such temperature, for times of less than about 10 minutes. However, lower temperatures such as 450°–500° F., with commensurately longer cure times, such as up to 25 minutes or more, can be typically used. The resulting undercoated article can then be subjected to testing for determining orientation of the valency state of the multivalent metal in the undercoating.

For the representative chromium, such testing can proceed by first contacting the cured undercoat with slightly basic aqueous medium. The resulting medium, after acidification, can then be subjected to the standard potassium iodide/starch titration test for determining hexavalent chromium. If hexavalent chromium is found to exist, the amount of same can be quantified by titrating with thiosulfate. This titration measures the free iodine of the sample which is quantitatively associated with the hexavalent chromium present. This test will thus indicate if the heat cure conditions have been appropriately selected for orienting the undercoating most preferably towards a minimum of higher valency state metal. The application of this test has been more particularly described hereinafter in connection with an illustrative embodiment of the invention. Representative test of this nature, but for other multi-valent metals of the undercoatings, are well known, as is the above-discussed test, to persons skilled in the art.

The resulting undercoated substrate can then be cooled before topcoating, particularly prior to application of a heat sensitive topcoat composition. Although this cooling can be simple air drying, the control of the undercoat curing will form a water-resistant coating and thereby afford the use of economical water quenching for at least a part of the cooling procedure. Typically, a cured undercoated article can proceed directly to water quenching, from the cure operation, and then go from such quenching right on to a topcoating operation. Also, removal of residual quench water from the article before topcoating may be desired.

The undercoated metal surface then has applied thereto a subsequent coating, also termed herein for convenience a "topcoating." Although the nature of this topcoat is very broad in contemplation the topcoating will also contain a multi-valent metal in liquid medium, with the metal being at least partially present in a higher valency state. For example, it has been shown in U.S. Pat. No. 3,718,509 that a hexavalent-chromiumcontaining bonding coating provides a highly serviceable topcoating for a metal substrate that is first treated with such a chromium-containing bonding coating composition which further contains a pulverulent metal. It is also contemplated that the purverulent-metal-containing base coating also form the topcoating. In general such topcoating may be a second application without variation, of the base coating. However, the undercoating may contain multi-valent metal differing from such metal of the topcoat. Also, although the topcoat is typically applied directly to the undercoating, such need not be the case. Thus, the chromium-coating bonding coating, disclosed as the topcoating in the 3,718,509 patent, can be an intermediate coating. The topcoating for such composite that is cured in accordance with the concepts of the present invention, can then be a pulverulent-metal-containing, as well as hexavalent-chromium-containing coating composition.

When the topcoating is established, generally by application directly to the undercoating, such applied coating, prior to curing, can be removed in the same manner as freshly applied undercoating, e.g., by rubbing with a damp cloth. The subsequent coating thus established is then subjected to elevated temperature curing conditions. These conditions are selected to initially transform the established undercoating to a dry and water-resistant coating, in the manner of the undercoating. Then, the curing conditions at elevated temperature are continued to orient the subsequent coating away from containing a minimum amount of the multi-valent metal in a higher valency state. Again selecting chromium as representative for determination of the appropriate cure conditions, such cure conditions for the subsequent coatings is a cure temperature above about 550° F. air temperature or more for a time of greater than about 10 minutes. Preferably, for greater efficiency, curing proceeds at 600°–700° F. air temperature, with cure times of 10 to 20 minutes. The resulting article can then be subjected to the same testing as hereinabove described for determining orientation of the valency state of the multivalent metal in the subsequent coating.

The undercoating and topcoated substrates can be further topcoated typically with any suitable paint, i.e., paint, primer, enamel, varnish or lacquer. Such paints may contain pigment in a binder or can be unpigmented as exemplified by cellulose lacquers, rosin varnishes, and oleoresinous varnishes. The paints can be solvent reduced or may be water reduced, e.g., latex or water soluble resins, including modified or soluble alkyds, or the paints can have reactive solvents such as in the polyesters or polyurethanes.

Particularly when the metal substrate to be coated is a weldable metal substrate, additional composite coating systems may be contemplated. For example, after the topcoating composition is applied, a weldable primer is applied and then, following welding, the resulting metal assembly is further topcoated. Since the weldable primers typically contain an electrically conductive pigment, the topcoating may be an electrocoated primer.

The electrodeposition of film-forming materials is well known and can include electrocoating of simply a film-forming material in a batch where such a bath may contain one or more pigments, metallic particles, drying oils, dyes, extenders and the like. Representative film-forming systems of this nature are set forth, for example, in U.S. Pat. Nos. 3,304,250 and 3,455,805. Also, substances of particular interest, for example in the automotive industry, are the anodically deposited film-forming materials as exemplified by U.S. Pat. No. 3,230,162. Included in these composite coating systems there can be an electrophoretically deposited zinc paint. Such may be deposited, for example, on the pre-paint treated metal surface of the present invention and the deposited zinc paints provides intermediate coating for subsequent topcoating. In U.S. Pat. No. 3,464,906 a zinc paint that can be electrodeposited and contains water-soluble or dispersible resin as a binder in aqueous medium, is taught.

Before application of the pre-paint coating composition to a metal substrate, which is the preferred substrate for protection owing to the corrosion protective nature of the undercoatings, although other substrates that can withstand the heat curing conditions are contemplated, it is generally advisable to remove foreign matter from the metal surface by thoroughly cleaning and degreasing. Degreasing can be accomplished with known agents such as sodium metasilicate, caustic soda, carbon tetrachloride, trichloroethylene and the like. The use of commercial alkaline cleaning compositions can be employed which combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

The following is an illustrative embodiment, and as such uses test panels, 4 × 8 inches, that are all cold rolled, low carbon steel panels. These panels are prepared for coating by first scrubbing with a cleaning pad which is a porous, fibrous pad of synthetic fiber impregnated with an abrasive. Thereafter, the scrubbed panels are immersed in a cleaning solution typically containing 1–5 ounces, per gallon of water, of a mixture of 25 weight percent tripotassium phosphate and 75 weight percent potassium hydroxide. This alkaline bath is maintained at a temperature of about 150°–180° F. Following the cleaning, the panels are rinsed with warm water and preferably dried.

A test composition is prepared from 200 milliliters (mls.) dipropylene glycol, 4 mls. of wetter which is a non-ionic, modified polyethoxy adduct have a viscosity in centipoises at 25° C. of 180 and a density at 25° C. of 8.7 pounds per gallon, 350 grams of zinc flake having particle thickness of about 0.1–0.2 micron and a longest dimension of discrete particles of about 15 microns, 700 mls. of deionized water, 50 grams of chromic acid and 2 grams of hydroxyethyl cellulose thickener. The thickener is a cream to white colored powder having a specific gravity of 1.38–1.40 at 20/20° C., an apparent density of 22–38 pounds/cu.ft., and all particles pass through 80 U.S. mesh.

Panels are coated by dipping into the coating composition, removing the panels and draining excess composition therefrom. This draining is then immediately followed by baking. Some panels thus coated have a high coating weight of 1400 milligrams per square foot (mg/ft$^2$) and others, by diluting the bath with distilled water before dipping, have a low coating weight of 700 mg/ft$^2$. Baking proceeds in a convection oven at an air temperature of about 450° F. for time of ten minutes. Subsequently, some of the low coating weight panels are re-dipped in the water diluted bath, so that they will achieve a final, two-coat weight of 1400 mg/ft$^2$. Coating weights are determined by weighing the panel before coating, and then reweighing the coated panel. After the second coat, the two-coat panels are baked at an air temperature of 600° F. for 15 minutes.

Some of the coated panels are then subjected to testing for leachable hexavalent chromium. The test method involved is a standard iodimetric titration. First, a test panel is immersed in 100 ml. of a 2% ammonium hydroxide solution for 15 minutes. The panel is removed and the solution is titrated. In this titration, and in brief, the solution is acidified with concentrated hydrochloric acid to insure that the pH of the sample is less than 7. To the acidifed sample there is then added a KI/starch ingredient. If the solution turns purple, the presence of leachable chrome is thus indicated. A purple sample can then be titrated with standardized thiosulfate to the purple/white color change. This titration measures the free iodine of the sample which is quantitatively associated with the hexavalent chromium.

By this test, both a low coating weight panel (one coat) and a one coat, but high coating weight panel, both cured at 450° F., show no leachable chromium. However, a two-coat panel indicates a color change, and thus the presence of leachable hexavalent chromium from the coating. Selected heavy coating weight one coat panels, as well as two-coat panels, are then subjected to a corrosion resistance test by means of the standard salt spray (fog) test for paint and varnishes as described in ASTM B-117-64. In this test, panels are placed in a chamber held at constant temperature where they are exposed to a fine spray (fog) of a 5% salt solution for a period of time until first red rust is noted on the panel. By this testing, the two-coated panel is observed to proceed in the test more than 1,000 hours, which is more than four times longer than the one coat panel, although each have comparable coating weights.

I claim:

1. In the process of protecting a coatable metal substrate with a coating composite, wherein a portion of said coating composite comprises an undercoating and a subsequent coating, each established from heat curable compositions that before curing contain, in liquid medium, a hexavalent-chromium-providing substance which is susceptible to valency reduction to a lower valence state during curing of applied composition, said chromium being at least partially present in said composition in the hexavalent higher valency state, said compositions each further containing reducing agent for said chromium, the improvement in said process for providing extended substrate corrosion resistance protection which comprises:

A. establishing said undercoating in said composite on the surface of said substrate, for providing substrate protection, but in non water-resistant condition;

B. precuring said established undercoating, at elevated temperature, to a dry and water-resistant coating, with the conditions of said elevated temperature precuring being selected to orient the undercoating towards reduction of said chromium in said higher valency state;

C. establishing said subsequent coating of said composite for providing substrate protection, with said subsequent coating being established in non water-resistant condition; and, D. curing said subsequent coating, at elevated temperature, with the conditions of said elevated temperature curing being selected for first passing said subsequent coating through the conditions of said precuring, thereby initially orienting the chromium of said subsequent coating towards reduction from said higher valency state, and with said elevated temperature conditions, by continuation thereof, then orienting the chromium of said subsequent coating towards a return to said higher valency state.

2. The process of claim 1 further characterized by having the liquid medium of both said undercoating and said subsequent coating containing water.

3. The process of claim 1 further characterized by having some non-elemental metal in said undercoating different from chromium.

4. The process of claim 1 further characterized by cooling the dry and water-resistant undercoating after precuring and prior to establishing said subsequent coating on said composite.

5. The process of claim 4 wherein said cooling includes quenching in a liquid medium containing water.

6. The process of claim 1 further characterized by establishing on said dry and water-resistant undercoating, following precuring, a water based, chromium-containing intermediate coating and then establishing said subsequent coating of said composite after establishing said intermediate coating.

7. A coated metal substrate protected with a coating composite, wherein a portion of said coating composite comprises an undercoating and a subsequent coating, each established from heat curable compositions that before curing contain, in liquid medium, a hexavalent-chromium-providing substance which is susceptible to valency reduction to a lower valence state during curing of applied composition, said chromium being at least partially present in said composition in the hexavalent higher valency state, said compositions each further containing reducing agent for said chromium, and with the undercoating being first established in said composite in non water-resistant condition and then precured at elevated temperature, to a dry and water-resistant coating with the conditions of said elevated temperature precuring being selected to orient the undercoating towards reduction of said chromium in said higher valency state, and with said subsequent coating being first established in non water-resistant condition and then cured at elevated temperature, with the conditions of said elevated temperature curing being selected for first passing said subsequent coating through the conditions of said precuring, thereby initially orienting the chromium of said subsequent coating towards reduction from said higher valency state, and with said elevated temperature conditions, by continuation thereof, then orienting the chromium of said subsequent coating towards a return to said higher valency state.

8. The coated substrate of claim 7 characterized by having said undercoating as the first coating on the surface of said substrate.

9. The coated substrate of claim 7 further characterized by having the liquid medium of both said undercoating and said subsequent coating containing water.

10. The coated substrate of claim 7 further characterized by having some non-elemental metal in said undercoating different from chromium.

11. The coated substrate of claim 7 further characterized by having a coating from a water based, chromium-containing coating composition intermediate between said undercoating and said subsequent coating.

12. The coated substrate of claim 7 further characterized by having pulverulent metal in elemental form as a constituent in one or both of said undercoating and said subsequent coating.

* * * * *